United States Patent
Schultes et al.

(10) Patent No.: US 6,809,163 B2
(45) Date of Patent: Oct. 26, 2004

(54) PROCESS FOR PREPARING BEAD POLYMERS WITH AN AVERAGE PARTICLE SIZE IN THE RANGE FROM 1 TO 40 μM, MOULDING COMPOSITIONS COMPRISING BEAD POLYMER, AND MOULDINGS AND PAMA PLASTISOLS

(75) Inventors: Klaus Schultes, Wiesbaden (DE); Thomas Suefke, Erzhausen (DE); Markus Parusel, Messel (DE); Guenter Schmitt, Darmstadt (DE); Winfried Belzner, Gruendau (DE)

(73) Assignee: Roehm GmbH & Co KG, Darmstadt (DE)

( * ) Notice: Subject to any disclaimer, the term of this patent is extended or adjusted under 35 U.S.C. 154(b) by 170 days.

(21) Appl. No.: 10/029,289

(22) Filed: Dec. 28, 2001

(65) Prior Publication Data

US 2002/0123563 A1 Sep. 5, 2002

(30) Foreign Application Priority Data

Dec. 28, 2000 (DE) .......................................... 100 65 501

(51) Int. Cl.[7] .............................. C08F 2/24; C08F 4/52; C08F 20/10; C08F 118/10; C08K 3/22
(52) U.S. Cl. ...................... 526/88; 526/156; 526/318.4; 526/319; 524/437
(58) Field of Search ........................... 524/437; 526/88, 526/156, 318.4, 319

(56) References Cited

U.S. PATENT DOCUMENTS 4,389,507 A * 6/1983 Podszun et al. ............ 524/460
5,744,565 A * 4/1998 Denkinger et al. ......... 526/318.4
6,355,712 B1  3/2002 Schultes et al. ............ 524/296

FOREIGN PATENT DOCUMENTS

GB  722 219  1/1955

OTHER PUBLICATIONS

Chemical Abstracts, vol. 92, No. 8, AN 92:59433w, p. 15, XP 002189328, Feb. 25, 1980, RO 62 938, Nov. 25, 1977.

* cited by examiner

*Primary Examiner*—Peter Szekely
(74) *Attorney, Agent, or Firm*—Oblon, Spivak, McClelland, Maier & Neustadt, P.C.

(57) ABSTRACT

The present invention provides a process for preparing bead polymers having an average particle size of 1 to 40 μm, which includes:

contacting:
  at least one polymerizable mix which includes at least 50% by weight of at least one (meth)acrylate monomer,
  at least one aluminum compound, and
  an aqueous phase,
to prepare a mixture;

dispersing the mixture at a shear rate $\geq 10^3$ s$^{-1}$ to form a dispersion, wherein the dispersion is stabilized by the aluminum compound; and polymerizing to produce bead polymers having an average particle size of 1 to 40 μm.

26 Claims, 1 Drawing Sheet

PROCESS FOR PREPARING BEAD POLYMERS WITH AN AVERAGE PARTICLE SIZE IN THE RANGE FROM 1 TO 40 µM, MOULDING COMPOSITIONS COMPRISING BEAD POLYMER, AND MOULDINGS AND PAMA PLASTISOLS

BACKGROUND OF THE INVENTION

Field of the Invention

The present invention relates to processes for preparing bead polymers with an average particle size in the range from 1 to 40 µm, in which a polymerizable mix is dispersed in an aqueous phase and polymerized. The present invention also relates to moulding compositions, mouldings and PAMA plastisols which include the bead polymers prepared according to the invention.

DISCUSSION OF THE BACKGROUND

In various applications there is a need for bead polymers whose particle diameters are of the order of size from 1 to 40 µm with relatively narrow particle size distribution. Such beads are useful additives for polymethyl methacrylate (PMMA) moulding compositions and for PAMA plastisols.

A particular field of application is light-scattering moulding compositions, where standard moulding compositions are blended with what are known as scattering beads, which are crosslinked and have a refractive index different from that of the matrix. Scattering particles based on PMMA and having a particle size well above 40 µm are currently used in these moulding compositions. The advantage of these scattering particles is the high level of forward scattering by the mouldings after incorporation of the scattering particles into the moulding compositions. This achieves a substantially higher luminous efficiency than that given by traditional opacifiers, e.g. $BaSO_4$ or $TiO_2$, at high scattering levels, since there is less loss due to backward scattering. This preferred forward scattering can be determined by measuring the transmittance combined with the halved-energy angle of mouldings which include the scattering beads.

The smaller the size of the scattering beads, the greater their scattering effect. The amount of beads used can be reduced if the beads are smaller. This reduction in the amount of beads saves costs and conserves resources. Moulding compositions which contain the smaller bead polymers have excellent mechanical properties, since the reduced amount of scattering beads has less effect on these properties. There is a problem, however, in that the perceived yellowness of the resultant moulding compositions increases markedly if scattering beads having a diameter less than 5 µm are used.

The beads described above can also be used for matt moulding compositions by blending the crosslinked beads with standard moulding compositions. When these moulding compositions are extruded the resultant articles have a velvety matt surface. A particular advantage of matt surfaces is that, unlike glossy surfaces, they make fingerprints and dirt difficult to see. A decisive factor in this application is that the particle size distribution of the beads is narrow. The smaller the particles themselves, the finer is the impression given by the surface.

A specific experiment in which a cast PMMA sheet that includes light-scattering particles is illuminated laterally reveals that the ideal particles have a size in the range from 5 to 20 µm, with very narrow size distribution.

The abovementioned beads may also be incorporated into polyalkyl (meth)acrylate (PAMA) plastisols in which the polymer particles having no or very little crosslinking, generally spray-dried emulsion polymers and/or beads, are mixed into a plasticizer. This gives what are known as plastisol pastes. These pastes are then applied and heated, whereupon the beads are solvated by the plasticizer so that cooling gives what is known as a plastisol film. Among the parameters of decisive importance for the formulation of the plastisol is paste stability, since the process known as gelling occurs even prior to heating of the paste. To increase paste stability, PMMA beads with particle diameter of about 40 µm are currently incorporated into the pastes together with the conventional, spray-dried emulsion polymers. A disadvantage of these beads is that they do not gel completely during the short heating phase, and this results in inhomogeneous plastisol films. The only ways of reducing the problem currently are to lengthen the heating phase or use a paste with low bead concentration.

Reducing the particle size to values in the range from 1 to 40 µm, together with a narrow bead distribution, enables a larger proportion of beads to be incorporated into the paste, thus improving paste stability.

Polymer particles whose size is of the order of from 1–10 µm can readily be prepared by precipitation polymerization, using large amounts of organic solvents. However, the handling of the solvents used creates safety and disposal problems. Work-up processes are also difficult. Beads obtained in this way are therefore expensive and cost reasons prevent their use in the application sectors described above.

Polymer beads can be obtained at lower cost by conventional suspension polymerization. However, the size of the resultant particles is generally greater than 40 µm, with broad distribution.

EP-A-0 443 609, for example, discloses a suspension process for preparing bead polymers by using a mixing cell with high shear energy to combine two phases introduced separately (monomers and continuous phase) and then polymerizing the monomers in a conventional reaction vessel. Various auxiliaries are mentioned for stabilizing the dispersion. These include inorganic substances, such as calcium phosphate, and organic compounds, such as cellulose derivatives or polyvinyl alcohol. EP-A-0 443 609 does not describe the use of aluminum compounds.

The examples in EP-A-0 443 609 state that particle sizes in the range from 5 to 10 µm are obtained. However, the monomer mixture was composed of 80% by weight of styrene. If these experiments are repeated using mixtures which include more than 50% by weight of acrylic monomers the particles become much larger. Although the use of known organic stabilizers gives small particles, if these particles are processed into moulding compositions marked yellowing occurs, causing increased reflection, i.e. reduced luminous efficiency.

SUMMARY OF THE INVENTION

One object of the present invention is to avoid the problems in conventional processes.

Another object of the present invention is to provide a process for preparing bead polymers, which results in particles with an average size in the range from 1 to 40 µm, and which on incorporation into moulding compositions give little yellowing.

Another object of the present invention is to provide a process for preparing bead polymers, which results in particles with an average size in the range from 1 to 40 µm, and which does not require large amounts of organic solvents that would require removal after the polymerization.

Another object of the invention is to provide a process which can be carried out using commercially available systems.

Another object on which the invention is to provide a process which can be implemented without any major safety risk.

Another object on which the invention is to provide a process which can be carried out without release or handling of pollutants.

Another object of the present invention is to provide a process which can be carried out at low cost.

Another object of the present invention is to provide a process for preparing bead polymers, which results in particles with an average size in the range from 1 to 40 µm, and in which the suspension obtained can be worked up by filtration.

Another object of the present invention is to provide a process for preparing bead polymers, which results in particles with an average size in the range from 1 to 40 µm, and in which the suspension obtained can be worked up by filtration under superatmospheric pressure.

Another object of the present invention is to provide a process for preparing bead polymers, which results in particles with an average size in the range from 1 to 40 µm, and in which the suspension obtained can be worked up by filtration under sub-atmospheric pressure.

Another object of the present invention is to provide moulding compositions which have excellent properties and can be produced at low cost.

Another object of the present invention is to provide PAMA plastisols and mouldings which have excellent properties and can be produced at low cost.

These and other objects of the invention have now been achieved by the present invention, the first embodiment of which provides a process for preparing bead polymers having an average particle size of 1 to 40 µm, which includes:
contacting:
at least one polymerizable mix which includes at least 50% by weight of at least one (meth)acrylate monomer,
at least one aluminum compound, and
an aqueous phase,
to prepare a mixture;
dispersing the mixture at a shear rate $\geq 10^3$ s$^{-1}$ to form a dispersion, wherein the dispersion is stabilized by the aluminum compound; and
polymerizing to produce bead polymers having an average particle size of 1 to 40 µm.

Another embodiment of the present invention provides the mixture prepared by the abovementioned process.

Another embodiment of the present invention provides the dispersion prepared by the abovementioned process.

Another embodiment of the present invention provides the bead polymers prepared by the abovementioned process.

Another embodiment of the present invention provides a PAMA plastisol, which includes the bead polymers prepared by the abovementioned process.

Another embodiment of the present invention provides a dental composition, which includes the bead polymers prepared by the abovementioned process.

Another embodiment of the present invention provides a porous mould, which includes at least one plastic and the bead polymers prepared by the abovementioned process.

Another embodiment of the present invention provides a moulding composition, which includes the bead polymers prepared by the abovementioned process.

Another embodiment of the present invention provides a moulding having at least one matt surface, which includes the bead polymers prepared by the abovementioned process.

Another embodiment of the present invention provides a composition, which includes the bead polymers prepared by the abovementioned process in contact with at least one matrix polymer.

Another embodiment of the present invention provides a process for preparing bead polymers having an average particle size of 1 to 40 µm, which includes:
contacting:
at least one polymerizable mix which includes at least 50% by weight of at least one (meth)acrylate monomer,
at least one means for stabilizing a dispersion, and
an aqueous phase,
to prepare a mixture;
dispersing the mixture at a shear rate $\geq 10^3$ s$^{-1}$ to form the dispersion, wherein the dispersion is stabilized by the means for stabilizing; and
polymerizing to produce bead polymers having an average particle size of 1 to 40 µm.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein the halved-energy angle (β) is determined using the apparatus depicted in FIG. 1.

DESCRIPTION OF THE PREFERRED EMBODIMENTS

Figure 1:
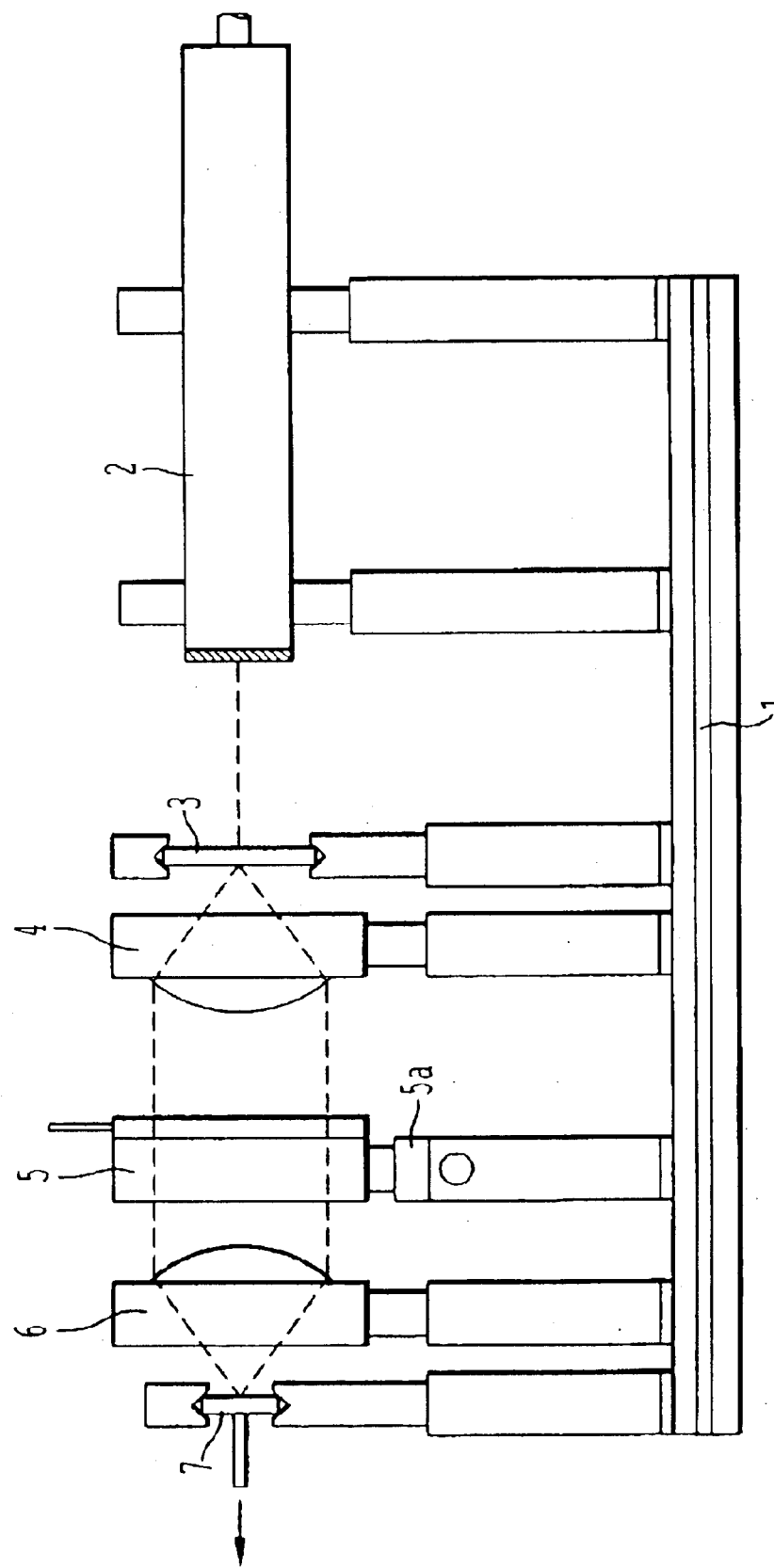

Various other objects, features and attendant advantages of the present invention will be more fully appreciated as the same becomes better understood from the following detailed description of the preferred embodiments of the invention.

The present invention has several advantages. The process of the invention permits filtration of the bead polymers obtained. The polymerization process of the present invention can be carried out using commercially available systems. Bead polymers may be obtained without any major safety risk, since there is no, or only minimal use of organic solvents, and in particular the release or handling of pollutants is avoided. When bead polymers prepared according to the invention are incorporated into moulding compositions or moulded to give mouldings they give a low Yellowness Index, high transmittance and a large halved-energy angle.

A preferred process for preparing high-quality bead polymers with an average particle size in the range from 1 to 40 µm can be provided by a method in which a polymerizable mix which includes at least 50% by weight of (meth)acrylates is dispersed in an aqueous phase and polymerized, where the dispersion, stabilized using an aluminum compound, is prepared at a shear rate $\geq 10^3$ s$^{-1}$, and without using any large amounts of an organic solvent which has to be removed after the polymerization.

A preferred embodiment of the invention includes the use of an emulsifier to prepare PAMA plastisols.

Another preferred embodiment of the invention includes the use of an emulsifier in a concentration range of from 0 to 5% by weight of the emulsifier, based on the weight of the aluminum compound, to prepare a moulding composition. This range includes all values and subranges therebetween, including 0.1, 0.5, 0.9, 1, 2, 3, 4, and 4.5%.

Another preferred embodiment of the invention includes the use of an emulsifier in a concentration range of from 0.3 to 3% by weight, based on the weight of the aluminum compound, to prepare mouldings. This range includes all values and subranges therebetween, including 0.4, 0.5, 0.6, 0.7, 0.8, 0.9, 1, 2, and 2.5%.

Another preferred embodiment of the invention includes filtering the dispersion obtained from the polymerization to prepare mouldings.

The bead polymers to be used for the purposes of the present invention have an average particle size in the range from 1 to 40 μm, preferably from 5 to 20 μm, which ranges include all values and subranges therebetween, including 2, 3, 4, 6, 7, 8, 9, 10, 15, 17, 19, 21, 25, 30, 35, 36, 37, 38 and 39 μm. The particle size is based on the particle diameter. One way of determining this value is by laser extinction. To this end, use may be made of a CIS particle analyser from the company L.O.T. GmbH, the test method for determining particle size being given in the user handbook, the entire contents of which being hereby incorporated by reference. This method is preferred. The particle size may also be determined by measuring and counting the particles on appropriate scanning electron micrographs.

Preferred embodiments of the bead polymers to be prepared according to the invention exhibit narrow size distribution. The standard deviation from the average particle diameter is particularly preferably ≦20 μm and very particularly preferably ≦10 μm, which ranges include all values and subranges therebetween, including 2, 4, 6, 8, 12, 14, 16 and 18 μm.

In particular embodiments of the process of the invention, the spherical or globular bead polymers prepared do not coagulate, aggregate or associate, or do so only to a slight extent.

The mix to be polymerized includes at least 50% by weight of (meth)acrylate, based on the weight of the monomers. The proportion of the (meth)acrylates is preferably at least 60% by weight and particularly preferably at least 80% by weight, based on the weight of the monomers, which ranges include all values and subranges therebetween, including 51, 52, 55, 57, 62, 65, 67, 69, 70, 75, 77, 79, 81, 85, 90, 95, and 100%. For the purposes of the present invention, a polymerizable mix is ethylenically unsaturated monomers, used individually or in the form of a mixture.

For the purposes of the present invention, (meth)acrylates encompass methacrylates and acrylates and mixtures of these two materials. These monomers are well known and are not particularly limited.

Preferred examples of (meth)acrylates include (meth) acrylates derived from saturated alcohols, for example methyl (meth)acrylate, ethyl (meth)acrylate, propyl (meth) acrylate, n-butyl (meth)acrylate, tert-butyl (meth)acrylate, pentyl (meth)acrylate and 2-ethylhexyl (meth)acrylate; (meth)acrylates derived from unsaturated alcohols, for example oleyl (meth)acrylate, 2-propynyl (meth)acrylate, allyl (meth)acrylate, vinyl (meth)acrylate;

aryl (meth)acrylates, such as benzyl (meth)acrylate or phenyl (meth)acrylate, where in each case the aryl radicals may be unsubstituted or have up to four substituents;

cycloalkyl (meth)acrylates, such as 3-vinylcyclohexyl (meth)acrylate, bornyl (meth)-acrylate;

hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)acrylate;

glycol di(meth)acrylates, such as 1,4-butanediol (meth) acrylate, (meth)acrylates of ether alcohols, for example tetrahydrofurfuryl (meth)acrylate, vinyloxyethoxyethyl (meth)acrylate;

amides and nitriles of (meth)acrylic acid, for example N-(3-dimethylaminopropyl)(meth)acrylamide, N-(diethylphosphono)(meth)acrylamide, 1-methacryloylamido-2-methyl-2-propanol;

sulphur-containing methacrylates, such as ethylsulphinylethyl (meth)acrylate, 4-thiocyanatobutyl (meth) acrylate, ethylsulphonylethyl (meth)acrylate, thiocyanato methyl (meth)acrylate, methylsulphinylmethyl (meth)acrylate, bis((meth)acryloyloxyethyl) sulphide;

polyfunctional (meth)acrylates, such as trimethyloylpropane tri(meth)acrylate. Mixtures are possible.

Besides the abovementioned (meth)acrylates, the mixes to be polymerized may also include other unsaturated monomers copolymerizable with the abovementioned (meth) acrylates. The amounts of these other unsaturated monomers generally used are from 0 to 50% by weight, preferably from 0 to 40% by weight and particularly preferably from 0 to 20% by weight, based on the weight of the monomers, and the comonomers may be used individually or as a mixture. These ranges include all values and subranges therebetween, including 1, 2, 3, 4, 5, 6, 7, 8, 9, 10, 15, 25, 30, 35, and 45%.

Preferred other unsaturated monomers include 1-alkenes, such as 1-hexene, 1-heptene; branched alkenes, such as vinylcyclohexane, 3,3-dimethyl-1-propene, 3-methyl-1-diisobutylene, 4-methyl-1-pentene;

vinyl esters, such as vinyl acetate;

styrene, substituted styrenes having an alkyl substituent in the side chain, e.g. α-methylstyrene and α-ethylstyrene, substituted styrenes having an alkyl substituent on the ring, such as vinyltoluene and p-methylstyrene, halogenated styrenes, such as monochlorostyrenes, dichlorostyrenes, tribromostyrenes and tetrabromostyrenes;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylim N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinyl-thiazoles and hydrogenated vinylthiazoles, vinyl-oxazoles and hydrogenated vinyloxazoles;

vinyl and isoprenyl ethers;

maleic acid derivatives, such as maleic anhydride, methylmaleic anhydride, maleimide, methylmaleimide; and dienes, such as divinylbenzene. Mixtures are possible.

The polymerization is generally initiated using known free-radical initiators. Preferred initiators include the azo initiators well known to the person skilled in the art, for example AIBN and 1,1-azobis-cyclohexanecarbonitrile, and also peroxy compounds, such as methyl ethyl ketone peroxide, acetylacetone peroxide, dilauroyl peroxide, tert-butyl 2-ethyl-perhexanoate, ketone peroxide, methyl isobutyl ketone peroxide, cyclohexanone peroxide, dibenzoyl peroxide, tert-butylperoxy benzoate, tert-butyl peroxy isopropyl carbonate, 2,5-bis(2-ethylhexanoylperoxy)-2,5-dimethyl-hexane, tert-butylperoxy 2-ethylhexanoate, tert-butyl-peroxy 3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydro-peroxide, tert-butyl hydroperoxide, bis(4-tert-butylcyclohexyl) peroxydicarbonate, mixtures of two or more of the abovementioned compounds with one another, and also mixtures of the abovementioned compounds with compounds not mentioned but likewise capable of forming free radicals.

The amount of these initiator compounds frequently used is from 0.1 to 10% by weight, preferably from 0.5 to 3% by weight, based on the total weight of the monomers, which ranges include all values and subranges therebetween, including 0.2, 0.3, 0.4, 0.9, 1, 2, 4, 5, 6, 7, 8, and 9%.

The ratio of water to monomer is usually in the range from 0.4:1 to 20:1, preferably from 2:1 to 8:1, based on the weight of the components, which ranges include all values and subranges therebetween, including 0.5, 0.6, 0.7, 0.8, 0.9, 1, 3, 4, 5, 6, 7, 9, 10, 12, 14, 16, and 18:1

The use of aluminum compounds which are sparingly soluble in water is necessary to stabilize the dispersion. These particularly include aluminum oxide $Al_2O_3$ and aluminum hydroxide $Al(OH)_3$, with $Al(OH)_3$ being preferred. Aluminum hydroxide prepared by precipitation is particularly preferred, and very little time should elapse between precipitating the material and forming the dispersion. In preferred embodiments of the process of the invention, the time which elapses between the precipitation of the material and the formation of the dispersion is 2 hours or less, preferably 1 hour or less and very particularly preferably 30 minutes or less, which ranges include all values and subranges therebetween, including 1, 2, 5, 10, 15, 20, and 25 minutes or less, and 0.75, 1.25, 1.5, and 1.75 hours or less.

An preferred method is to dissolve $Al_2(SO_4)_3$ in water. This solution may then be treated with a sodium carbonate solution until the pH is in the range from 5 to 5.5. This procedure gives colloidal distribution of the aluminum compound in the water, this distribution being particularly preferred.

The amount used of the aluminum compound is preferably from 0.5 to 200% by weight, particularly preferably from 3 to 100% by weight and very particularly preferably from 4 to 20% by weight, based on the total weight of the monomers used, which ranges include all values and subranges therebetween, including 0.6, 0.9, 1, 2, 5, 7, 10, 30, 50, 70, 90, 125, 150, and 175%. If smaller amounts are used there is a risk that the dispersion obtained will be unstable and phase separation will occur, or at least the formation of relatively large aggregates. If larger amounts are used there is the risk that it will not be possible to obtain a homogeneous dispersion.

Other preferred processes include those in which other auxiliaries are used for stabilization alongside the aluminum compound. These particularly include surface-active substances, such as anionic, cationic or neutral emulsifiers.

Preferred examples of anionic emulsifiers are alkali metal salts of higher fatty acids having from 8 to 30 carbon atoms, such as palmitic, stearic or oleic acid, alkali metal salts of sulphonic acids such as those having from 8 to 30 carbon atoms, in particular sodium salts of alkyl- or arylalkylsulphonic acids, alkali metal salts of half-esters of phthalic acid, and alkali metal salts of resin acids, such as abietic acid. The carbon atom ranges include all values and subranges therebetween, including 9, 10, 12, 15, 17, 18, 20, 21, 22, 24, 25, and 28 carbons.

Examples of cationic emulsifiers are salts of long-chain, in particular unsaturated, amines having from 10 to 20 carbon atoms, and quaternary ammonium compounds having relatively long-chain olefinic or paraffinic radicals. This range includes all values and subranges therebetween, including 11, 12, 13, 14, 15, 16, 17, 18 and 19 carbons.

Examples of neutral emulsifiers are ethoxylated fatty alcohols, ethoxylated fatty acids and ethoxylated phenols and fatty acid esters of polyhydric alcohols, such as pentaerythritol or sorbitol.

The amount used of the abovementioned emulsifiers is preferably in the range from 0 to 5% by weight, particularly preferably from 0.3 to 3% by weight, based on the weight of the aluminum compound, which ranges include all values and subranges therebetween, including 0.1, 0.2, 0.5, 0.9, 1, 1.1, 2, 2.5, 3.1, 4 and 4.5%.

The usual additives and auxiliaries may also be added to the mixture prior to, during or after formation of the dispersion. These include particularly substances which give the particles particular properties, for example polymers, dyes and pigments, where appropriate those with ferromagnetic properties. Use may also be made of complexing agents, such as EDTA or Trilon A, and compounds which inhibit the formation of tank deposit, such as polyethylene glycol. Mixtures are possible.

For the purposes of the present invention, dispersion takes place at a shear rate $\geq 10^3$ s$^{-1}$. The shear rate is preferably in the range from $10^4$ to $10^5$ s$^{-1}$, which ranges include all values and subranges therebetween, including $2\times10^3$, $5\times10^3$, $7\times10^3$, $2\times10^4$, $5\times10^4$, $7\times10^4$, $2\times10^5$, $5\times10^5$ and $7\times10^5$ s$^{-1}$. At shear rates $<10^3$ s$^{-1}$ the particle size of the resultant bead polymer is greater than 40 μm. The shear rate can be defined as the value obtained by dividing the absolute value for the velocity difference between two planes by the distance between the two planes. The mixture to be dispersed here is located in the space between the two planes, and the distance between these is small, up to 6 mm, which range includes all values and subranges therebetween, including 1, 2, 3, 4 and 5 mm.

The dispersion may be prepared using any process suitable for this purpose, usually using dispersers known to the person skilled in the art, including the DISPERSMAT from VMA-Getzmann, Reichshof, Germany; the ULTRA-TURRAX from Janke and Kunkel, Staufen, Germany and the pressure homogenizer from Gaulin, Lübeck, Germany. There are also known devices with a rotor-stator system, such as the DISPAX from Janke and Kunkel, Staufen, Germany; CAVITRON homogenizers from V. Hagen & Funke, Sprochhövel, Germany; homogenizers from Kotthoff, Essen, Germany and homogenizers from Doee Oliver, Grevenbroich, Germany. These devices are usually operated at rotation rates of 1,000 to 25,000 rpm, preferably from 2,000 to 25,000 rpm, which ranges include all values and subranges therebetween, including 1,500, 1,750, 2,250, 5,000, 10,000, 15,000 and 20,000 rpm. The high shear forces required to form the dispersion may also be achieved by exposure to ultrasound, passing the mixture to be dispersed through small-diameter nozzles or through a narrow gap under high pressure, or with the aid of colloid mills.

The dispersion of the monomers and the other constituents of the reaction mixture preferably takes place at temperatures in the range from 0 to 100° C., preferably in the range from 20 to 60° C., but no restriction is implied here. These ranges include all values and subranges therebetween, including 2, 3, 5, 10, 15, 25, 35, 45, 55, 65, 75, 85, and 95° C.

The dispersion time may be within a wide range, depending on the desired diameter of the monomer droplets, on the size distribution to be achieved and on the quantitative proportions of the constituents in the mixture. The dispersion can generally be prepared within a few hours.

The dispersion process generally takes place prior to starting the polymerization. However, the dispersion may also be subjected to a high shear force, in particular at the start of the polymerization, to prevent the possible formation of larger aggregates, but the polymerization should take place soon after formation of the dispersion.

Surprisingly, it has been found that the dispersion stabilized by the aluminum compound can be stored for a relatively long period. This property makes it easier to use conventional polymerization systems, since, unlike in many conventional processes, there is no requirement for exposure to shear forces at the start of the polymerization.

The polymerization may be carried out at atmospheric pressure, subatmospheric pressure or superatmospheric pressure, and the polymerization temperature is not critical, but is generally in the range from 0–200° C., preferably from 40–130° C. and particularly preferably from 60 to 120° C., depending on the initiator system used, but no limitation is implied here. These ranges include all values and subranges therebetween, including 2, 5, 10, 25, 45, 65, 85, 95, 100, 150 and 175° C.

Once the polymerization has ended the aluminum compound may, for example, be converted into a water-soluble form by adding sulphuric or hydrochloric acid. The bead polymer may readily be isolated from the water by pressure filtration. If known organic compounds are used instead of the aluminum compound to stabilize the dispersion, the rheological properties of the mixture make this type of filtration impossible.

The bead polymers obtained according to the invention are particularly suitable for use in polyalkyl (meth)acrylate (PAMA) plastisols, which are another aspect of the present invention. These plastisols are obtained by incorporating the beads into known plasticizers listed, inter alia, in EP-A-0 846 726, the entire contents of which being hereby incorporated by reference.

The PAMA plastisol pastes have excellent properties. In particular they have good storage stability. They are moreover easy to process, and they form a homogeneous plastisol film. This plastisol film has excellent stability and strength.

The bead polymers prepared according to the process of the present invention may moreover be used to prepare plastics for the dental sector. Beads used in this sector preferably include no crosslinkers. The preparation of these plastics is well known. They are usually prepared by what is known as the powder-liquid process or Chemoplast process, with hot or cold polymerization, and the beads which can be prepared according to the invention can be used here in the form of a mixture with other PMMA bead polymers, as powder components.

The beads obtained may moreover be used to produce porous plastic moulds, for example those used in the ceramics industry. The production of these plastic moulds is known per se: the peroxide-containing powder component, such as a bead polymer to be prepared according to the invention, or this polymer in the form of a mixture with other bead polymers, is mixed with water, using a dispersing agent. A monomer mixture which includes an amine component and an emulsifier is then added to this dispersion.

The bead polymers obtained from the process described above are also used in moulding compositions, which are likewise provided by this invention. Suitable matrix polymers are any of the thermoplastically processable polymers known for this purpose. These include polyalkyl (meth) acrylates, such as polymethyl methacrylate (PMMA), polyacrylonitriles, polystyrenes, polyethers, polyesters, polycarbonates, polyvinyl chlorides. Preference is given here to polyalkyl (meth)acrylates. These polymers may be used individually or else as a mixture, or else may be present in the form of copolymers.

The moulding compositions and the plastisols may include conventional additives of any type. These include antistats, antioxidants, mould-release agents, flame retardants, lubricants, dyes, flow improvers, fillers, light stabilizers, and organic phosphorous compounds, such as phosphites or phosphonates, pigments, weathering stabilizers, and plasticizers. Mixtures are possible.

The moulding compositions described above may be used in known processes, such as extrusion, to give mouldings with a matt surface. If the refractive indices of matrix polymer and bead polymer differ, examples of the resultant products are protective covers used for lighting units and emitting diffuse light.

EXAMPLES

Having generally described this invention, a further understanding can be obtained by reference to certain specific examples which are provided herein for purposes of illustration only and are not intended to be limiting unless otherwise specified.

Example 1

To prepare the suspension polymer use was made of an aluminum hydroxide Pickering stabilizer, prepared by precipitation from aluminum sulphate and soda solution directly prior to starting the actual polymerization. To this end, 16 g of $Al_2(SO_4)_3$, 0.032 g of complexing agent (Trilon A) and 0.16 g of emulsifier (emulsifier K 30 obtainable from Bayer AG; sodium salt of a $C_{15}$ paraffinsulphonate) were first dissolved in 0.8 l of distilled water. A 1N sodium carbonate solution was then added, with stirring and at a temperature of about 40° C., to the aluminum sulphate dissolved in water, the resultant pH being in the range from 5 to 5.5. This procedure gave colloidal distribution of the stabilizer in the water.

After the precipitation of the stabilizer, the aqueous phase was transferred to a glass beaker. 110 g of methyl methacrylate, 80 g of benzyl methacrylate, 10 g of allyl methacrylate, 4 g of dilauroyl peroxide and 0.4 g of tert-butyl 2-ethylperhexanoate were added into the beaker. This mixture was dispersed by a disperser (LLTRA-TURRAX S50N-G45MF, Janke and Kunkel, Staufen, Germany) for 15 minutes at 7,000 rpm.

Following this exposure to shear, the reaction mixture was charged to the reactor, which had been preheated to the appropriate reaction temperature of 80° C., and polymerized with stirring (600 rpm) at about 80° C. (polymerization temperature) for 45 minutes (polymerization time). A post-reaction phase then followed at about 85° C. internal temperature for 1 hour. After cooling to 45° C., the stabilizer was converted into water-soluble aluminum sulphate by adding 50% strength sulphuric acid. The beads were worked up by filtering the resultant suspension through a commercially available textile filter and drying at 50° C. for 24 hours in a heated cabinet.

The size distribution was studied by laser extinction. The average size $V_{50}$ of the particles was 7.1 µm, with a standard deviation of 2.63 µm. The beads had a spherical shape, and no fibres were observed. No coagulation occurred.

The study was continued by taking a standard PMMA moulding composition (PLEXIGLAS® 7 N obtainable from Röhm GmbH) and modifying this with 6% by weight of the light-scattering beads prepared in Example 1. This moulding composition was injection moulded to give a test specimen of dimension 60×45×3 mm, which was used to determine transmittance (T) to DIN 5036, Yellowness Index (YI) to DIN 6167 and halved-energy angle (β) using the method described above. The entire contents of the aforementioned DIN standards are hereby incorporated by reference.

The halved-energy angle (β) is determined using the apparatus depicted in FIG. 1:

The test device is composed of a baseplate (1) on which the following components have been mounted as shown in FIG. 1:

He-Ne laser with beam shutter (2)

specimen holder (3) at the focus of the condenser lens (4) with diameter 55 mm; f=39 mm iris diaphragm (5) with max. diameter 60 mm and height-setting device (5a), condenser lens (6) with diameter 55 mm; f=39 mm focusing onto the photodiode (7)

With no specimen and with the beam shutter for the He-Ne laser (2) open, the laser beam of initial diameter about 1 mm is incident on the centre of each component in the sequence given and on the centre of the photodiode (7). If a transparent, light-scattering specimen is installed, the transmitted proportion of the laser beam is made to diverge to an extent depending on the scattering power of the specimen. The condenser lens (4) then converts the laser beam to a parallel extended beam of not more than 55 mm diameter, which passes unhindered through the fully open iris diaphragm (5) to the second condenser lens (6), which focuses it onto the sensor surface of the photodiode (7). The diode current is indicated by a measuring device and is proportional to the light flux. If the iris diaphragm (5) is slowly closed this then blocks the beam, beginning at the outside, and the indicated current falls. The diaphragm diameter at which half of the initial current is indicated is the halved-energy angle (β).

The equation used to determine this value is:

$$\beta = \arctan\frac{D}{2f}$$

where D=diaphragm diameter in mm at halved current,
f=focal length of condenser lens=39 mm.

The resultant data are given in Table 1.

Comparative Example 1

Example 1 was substantially repeated, but using 24 g of tricalcium phosphate instead of the freshly precipitated aluminum hydroxide.

The size distribution of the resultant bead polymer was studied by laser extinction. The average size $V_{50}$ of the particles was 56.9 μm, with a standard deviation of 20.8 μm.

Example 2

Example 1 was substantially repeated, but 80 times the amount of each constituent was used. The associated engineering required that some changes be made. The precipitated Pickering stabilizer formed an initial charge in the reactor with monomers, initiator and additives, and was then dispersed at a temperature of 40° C. with the aid of a continuous disperser (DISPAX reactor from Janke and Kunkel). To this end, the mixture was cycled through the disperser for 30 minutes, while within the reactor the dispersion was stirred with a conventional stirrer at 150 rpm.

After 30 minutes the dispersion was heated to 80° C. Polymerization and work-up took place as in Example 1.

The size distribution of the resultant bead polymer was studied by laser extinction. The average size $V_{50}$ of the particles was 16.3 μm, with a standard deviation of 4.6 μm.

The study was continued by taking a standard PMMA moulding composition (PLEXIGLAS® 7 N obtainable from Röhm GmbH) and modifying this with 6% by weight of the light-scattering beads prepared in Example 2. This moulding composition was injection moulded to give a test specimen of dimension 60×45×3 mm, which was used to determine the values described in Example 1. The resultant data are given in Table 1.

Comparative Example 2

Example 1 was substantially repeated, but 3.2 g of Mowiol 4088, an organic stabilizer obtainable from Clariant GmbH, were used instead of the freshly precipitated aluminum hydroxide.

Preparation of the dispersion and polymerization took place as in Example 1. The rheological properties of the mixture prevented the mix from being worked up by pressure filtration.

The size distribution of the resultant bead polymer was studied by laser extinction. The average size $V_{50}$ of the particles was 4.56 μm, with a standard deviation of 1.41 μm.

The study was continued by taking a standard PMMA moulding composition (PLEXIGLAS® 7 N obtainable from Röhm GmbH) and modifying this with 6% by weight of the light-scattering beads prepared in Comparative Example 2. This moulding composition was injection moulded to give a test specimen of dimension 60×45×3 mm, which was used to determine the values described in Example 1. The resultant data are given in Table 1.

Comparative Example 3

Polymers formulated as in Example 1 were prepared in cyclohexane by a precipitation process described in DE-A-43 27 464, the entire contents of which being hereby incorporated by reference.

The average size of the particles was 6 μm, with a standard deviation of 1.41 μm. These values were determined by way of scanning electron micrographs, measuring and counting individual particles.

The study was continued by taking a standard PMMA moulding composition (PLEXIGLAS® 7 N obtainable from Röhm GmbH) and modifying this with 6% by weight of the light-scattering beads prepared in Comparative Example 3. This moulding composition was injection moulded to give a test specimen of dimension 60×45×3 mm, which was used to determine the values described in Example 1. The resultant data are given in Table 1.

TABLE 1

|  | T (%) | YI (%) | β (°) |
|---|---|---|---|
| Example 1 | 76.3 | 9.4 | 22.5 |
| Example 2 | 91.1 | 2.9 | 18.5 |
| Comp. Example 2 | 71.9 | 28.2 | — |
| Comp. Example 3 | 77 | 9.5 | 23.1 |

The test results in Table 1 show that the scattering beads prepared by the process of the present invention and compounded into moulding compositions (Examples 1 and 2) scatter the light very effectively without any major energy loss. These moulding compositions moreover have advantages when comparison is made with the scattering beads obtained as in Comparative Example 2. Although the scattering agent used gave a high level of light scattering, there was an associated marked rise in the Yellowness Index YI, and transmittance T is markedly lower than for the moulding compositions modified using scattering beads of Example 1 or 2. A high level of backward scattering is equivalent to a high energy loss, and is attributable to decomposition of the organic stabilizer used. Optical properties are almost identical in Example 1 and Comparative Example 3. A disadvantage for Comparative Example 3 is the preparation process for the scattering beads used in the example. These are prepared by precipitation polymerization in cyclohexane. The morphology of the resultant beads complicates the drying process, which also has safety problems due to the organic solvent.

Obviously, numerous modifications and variations of the present invention are possible in light of the above teachings. It is therefore to be understood that within the scope of the appended claims, the invention may be practiced otherwise than as specifically described herein.

This application is based on German patent application 100 65 501.7, filed Dec. 28, 2000, the entire contents of which are hereby incorporated by reference, the same as if set forth at length.

What is claimed is:

1. A process for preparing bead polymers having an average particle size of 1 to 40 µm, comprising:
   contacting:
      at least one polymerizable mix which comprises at least 50% by weight of at least one (meth)acrylate monomer,
      at least one aluminum compound, and
      an aqueous phase,
   to prepare a mixture;
   dispersing said mixture at a shear rate $\geq 10^3 s^{-1}$ to form a dispersion, wherein said dispersion is stabilized by said aluminum compound; and
   polymerizing to produce bead polymers having an average particle size of 1 to 40 µm.

2. The process according to claim 1, wherein said aluminum compound is $Al(OH)_3$.

3. The process according to claim 1, wherein said aluminum compound is $Al(OH)_3$, and the process further comprises preparing the $Al(OH)_3$ by precipitation.

4. The process according to claim 1, wherein the concentration of the aluminum compound, based on the weight of the polymerizable mix, is 0.5 to 200% by weight.

5. The process according to claim 1, wherein the concentration of the aluminum compound, based on the weight of the polymerizable mix, is 3 to 100% by weight.

6. The process according to claim 1, wherein the concentration of the aluminum compound, based on the weight of the polymerizable mix, is 4 to 20% by weight.

7. The process according to claim 1, wherein the bead polymers have an average particle size of 5 to 20 µm.

8. The process according to claim 1, wherein the polymerizable mix comprises at least 60% by weight of (meth)acrylate monomer.

9. The process according to claim 1, wherein said mixture further comprises at least one emulsifier.

10. The process according to claim 1, wherein said mixture further comprises at least one emulsifier, and wherein the concentration of the emulsifier, based on the weight of the aluminum compound, is 0 to 5% by weight.

11. The process according to claim 1, wherein said mixture further comprises at least one emulsifier, and wherein the concentration of the emulsifier, based on the weight of the aluminum compound, is 0.3 to 3% by weight.

12. The process according to claim 1, wherein, after the polymerizing, said bead polymers are comprised within a second dispersion, and wherein the process further comprises filtering the second dispersion.

13. The process according to claim 1, wherein, after the polymerizing, said bead polymers are comprised within a second dispersion, and wherein the process further comprises adding at least one acid to the second dispersion.

14. The process according to claim 1, wherein, after the polymerizing, said bead polymers are comprised within a second dispersion, wherein the process further comprises adding at least one acid to the second dispersion, filtering, and drying the bead polymers.

15. The process according to claim 1, further comprising contacting said bead polymers with at least one matrix monomer or polymer.

16. The mixture prepared by the process of claim 1.

17. A molded article prepared from the bead polymers prepared by the process of claim 1.

18. The bead polymers prepared by the process of claim 1.

19. A molded article prepared from a polyalkyl (meth)acrylate plastisol, wherein the polyalkyl (meth)acrylate plastisol comprises the bead polymers prepared by the process of claim 1.

20. A molded dental article, prepared from the bead polymers prepared by the process of claim 1.

21. A porous mould, comprising at least one plastic and the bead polymers prepared by the process of claim 1.

22. A moulding composition, comprising the bead polymers prepared by the process of claim 1.

23. A moulding having at least one matt surface, comprising the bead polymers prepared by the process of claim 1.

24. A composition, comprising the bead polymers prepared by the process of claim 1 in contact with at least one matrix polymer.

25. A process for preparing bead polymers having an average particle size of 1 to 40 µm, comprising:
   contacting:
      at least one polymerizable mix which comprises at least 50% by weight of at least one (meth)acrylate monomer,
      at least one means for stabilizing a dispersion, and
      an aqueous phase,
   to prepare a mixture;
   dispersing said mixture at a shear rate $\geq 10^3 s^{-1}$ to form the dispersion, wherein said dispersion is stabilized by said means for stabilizing; and
   polymerizing to produce bead polymers having an average particle size of 1 to 40 µm.

26. The process according to claim 25, wherein said means for stabilizing comprises at least one aluminum compound.

* * * * *